(12) United States Patent
Burda et al.

(10) Patent No.: US 7,477,957 B2
(45) Date of Patent: Jan. 13, 2009

(54) METHOD AND SYSTEM OF CONTROLLED MOVEMENT OF DYNAMIC-ROUTE WIP

(75) Inventors: Richard G. Burda, Pleasant Valley, NY (US); Aseem K. Joshi, Wappingers Falls, NY (US); Sameer T. Shikalgar, Wappingers Falls, NY (US); Susan Kangas van Oss, Lagrangeville, NY (US); Patrick R. Varekamp, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 11/393,030

(22) Filed: Mar. 30, 2006

(65) Prior Publication Data
US 2007/0239303 A1 Oct. 11, 2007

(51) Int. Cl.
*G06F 19/00* (2006.01)
(52) U.S. Cl. .................. 700/101; 700/95; 700/97; 700/100
(58) Field of Classification Search .......... 700/90, 700/95, 97, 99–102
See application file for complete search history.

(56) References Cited

U.S. PATENT DOCUMENTS

| | | | |
|---|---|---|---|
| 5,818,716 A * | 10/1998 | Chin et al. | 700/100 |
| 6,259,959 B1 * | 7/2001 | Martin | 700/99 |
| 6,564,113 B1 * | 5/2003 | Barto et al. | 700/99 |
| 6,684,121 B1 * | 1/2004 | Lu et al. | 700/108 |
| 6,868,298 B2 * | 3/2005 | Baweja et al. | 700/100 |
| 7,054,703 B2 * | 5/2006 | Wu et al. | 700/100 |
| 7,103,435 B2 * | 9/2006 | Chao et al. | 700/100 |
| 7,179,664 B2 * | 2/2007 | Huang et al. | 438/14 |
| 2005/0261921 A1 * | 11/2005 | Chien et al. | 705/101 |

OTHER PUBLICATIONS

Stephen J. Shea, et al., "Development and Implementation the Range Management System in a Multi-Flow Fabricator", 1997 IEEE/SEMI Advanced Semiconductor Manufacturing Conference, p. 398-404.

* cited by examiner

*Primary Examiner*—Alexander J Kosowski
(74) *Attorney, Agent, or Firm*—James J. Cioffi; Greenblum & Bernstein P.L.C.

(57) ABSTRACT

A system and method for driving new technology WIP at a controlled speed side-by-side with production WIP using a common range management infrastructure. The system and method allow new technology WIP and production WIP to be driven together in the same fabricator with the same degree of speed and predictability. The system and method may include at least one device configured to create a target based on a sum of active WIP targets for at least one route, find all lots of active WIP on the at least one route, tag each of the lots until a first occurrence of a sum of WIP of the tagged lots exceeds or equals the target, and assign a priority to each of the tagged lots based on a predetermined criteria.

19 Claims, 5 Drawing Sheets

METHOD AND SYSTEM OF CONTROLLED MOVEMENT OF DYNAMIC-ROUTE WIP

FIELD OF THE INVENTION

The invention relates generally to the management of manufacturing processes, and more particularly to controlling the movement of dynamic route work-in-progress in a range management system.

BACKGROUND OF INVENTION

In the current business environment, new manufacturing methods are required to shorten product cycle times and reduce costs in order to remain competitive and provide a level of service which is demanded by customers. Companies, including semiconductor manufacturers, have utilized methodologies, such as lean manufacturing, to achieve these objectives. Range management is a process which utilizes lean manufacturing techniques for managing daily work flow and driving sustained reductions in cycle time, inventory and cost, and for driving gains in output.

Range management systems focus on delivering work-in-progress (WIP) on a known route at a known speed to meet committed customer deliveries on schedule. In a typical range management system, manufacturing is partitioned into a series of flows, where the products in each flow follow similar routes through the fabrication facility. These flows are divided into ranges, and each range may include one or more operations. An operation is where the units (e.g., wafers) of a production lot are actually worked on, and may include, for example: lithography, metrology, overlay, metrology CD, etc. The collection of operations of a range typically sum to one day of cycle time.

The WIP for each customer is typically assigned a given x-factor so that each lot in the line can be moved relative to other lots in a controlled manner. The x-factor is used to define the speed of the flow, and determine how many operations will fit into one day of cycle time. The x-factor is equivalent to cycle-time performance divided by raw processing time, as understood by one skilled in the art. The goal is for each lot to undergo one day of process time, at the defined speed (x-factor), in each day (24 hours).

In a range management system, each range has a daily takt rate (DTR) which is the ideal daily throughput rate for that range. Takt is a German word for "beat" and represents the pace at which product moves through the manufacturing process. Daily targets for each range are set based on the DTR and also the knowledge of how much WIP is in the range, and how much WIP is in the next range. The objective is to keep WIP balanced, while achieving one day of process time on each lot. When a range meets the target output for a day, the range is stopped so that effort can be placed on other lots in ranges that still need to achieve the target output. When a lot gets behind schedule and does not complete the one day of process time, a gap may exist in the WIP profile, and an acceleration mode, or pull factor, may be applied to accelerate WIP to fill the gap. By operating the manufacturing line with this methodology, the WIP stays balanced and resources are evenly distributed to process WIP across all operations in the manufacturing line.

Standard range management systems work well with production WIP that is on a predefined and stable route in which its flow and total process cycle time is predictable. However, WIP does not always follow a predefined route. For instance, the flow of some new technology WIP may vary from the predefined routes depending on the experimentation required of the product. The total cycle time of any given lot of new technology WIP is not predictable because it is unknown which operations the lot may undergo.

Trying to control new technology WIP with daily takt rates and rules based on range definition does not work well. A further problem arises when a fabricator shares resources and machines between a mix of production WIP and new technology WIP. The disparate nature of the different types of WIP makes it difficult to treat them equivalently from an x-factor point of view. As a result, it is difficult to manage the manufacturing of production WIP and new technology WIP within the same fabrication system.

Accordingly, there exists a need in the art to overcome the deficiencies and limitations described hereinabove.

SUMMARY OF THE INVENTION

In a first aspect of the invention, a system includes at least one device configured to: create a target based on a sum of active WIP targets for at least one route; find all lots of active WIP on the at least one route; tag each of the lots until a first occurrence of a sum of WIP of the tagged lots exceeds or equals the target; and assign a priority to each of the tagged lots based on a predetermined criteria.

In a second aspect of the invention, a method includes: determining a flow of manufacturing processes; setting a target rate for the flow; identifying and tagging lots corresponding to the flow; assigning a priority to each tagged lot; processing the tagged lots based at least in part on the priority of each lot; and untagging at least one of the tagged lots such that the processing of the at least one of the tagged lots is at least temporarily stopped.

In a third aspect of the invention, a computer program product includes a computer readable medium having a computer readable program, wherein the computer readable program when executed on a computer causes the computer to: create a target based on a sum of active WIP targets for at least one route; find all lots of active WIP on the at least one route; tag each of the lots until a sum of WIP of the tagged lots equals or exceeds the target; and assign a priority to each of the tagged lots based on a predetermined criteria.

BRIEF DESCRIPTION OF THE DRAWINGS

The foregoing will be better understood from the following detailed description of embodiments of the invention with reference to the drawings, in which.

DETAILED DESCRIPTION OF EMBODIMENTS OF THE INVENTION

The invention is directed to a system and method for managing manufacturing processes. According to the invention, a method and system are provided for driving new technology WIP at a controlled speed side-by-side with production WIP using a common range management infrastructure. In this manner, both production WIP and new technology WIP can be driven together in the same fabricator with the same degree of speed and predictability.

Figure 1:
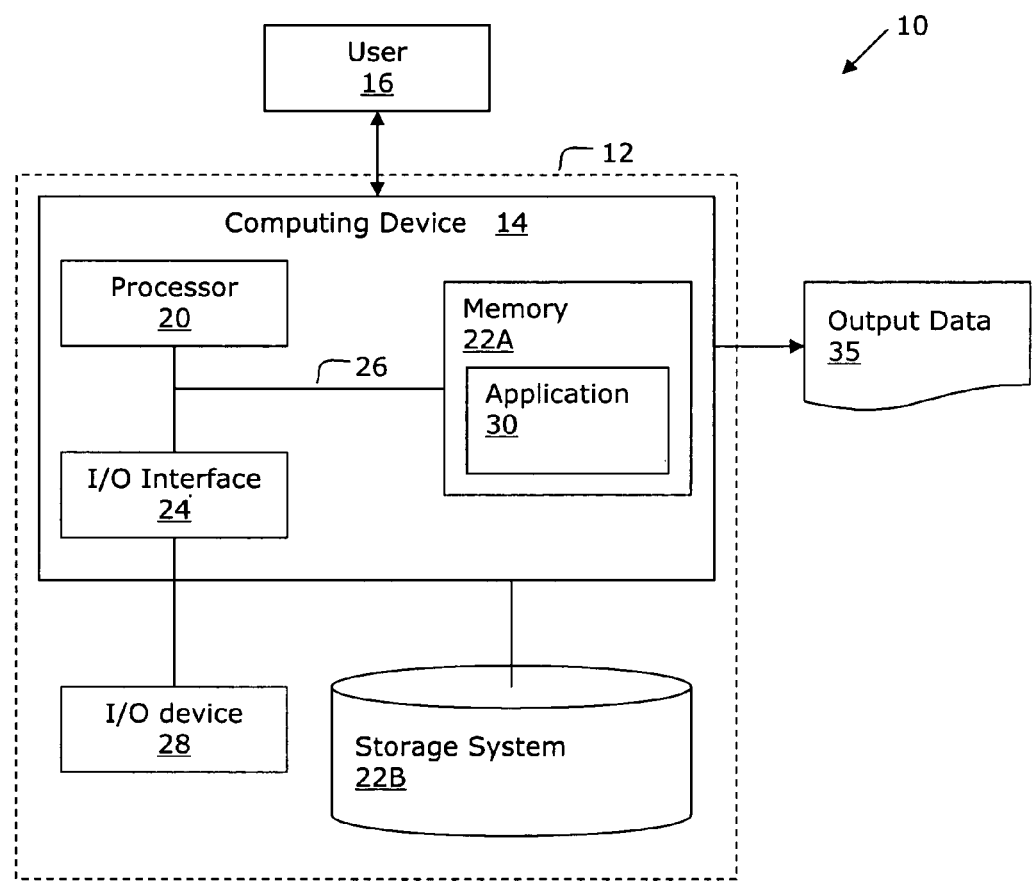
FIG. 1 shows an environment of the invention.

FIG. 1 shows an illustrative environment 10 for managing the processes in accordance with embodiments of the invention. To this extent, the environment 10 includes a computer infrastructure 12 that can perform the processes described herein, such as, for example, managing manufacturing processes in a facility. In particular, the computer infrastructure 12 is shown including a computing device 14 that comprises an application 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to create the output data 35.

Figure 2:
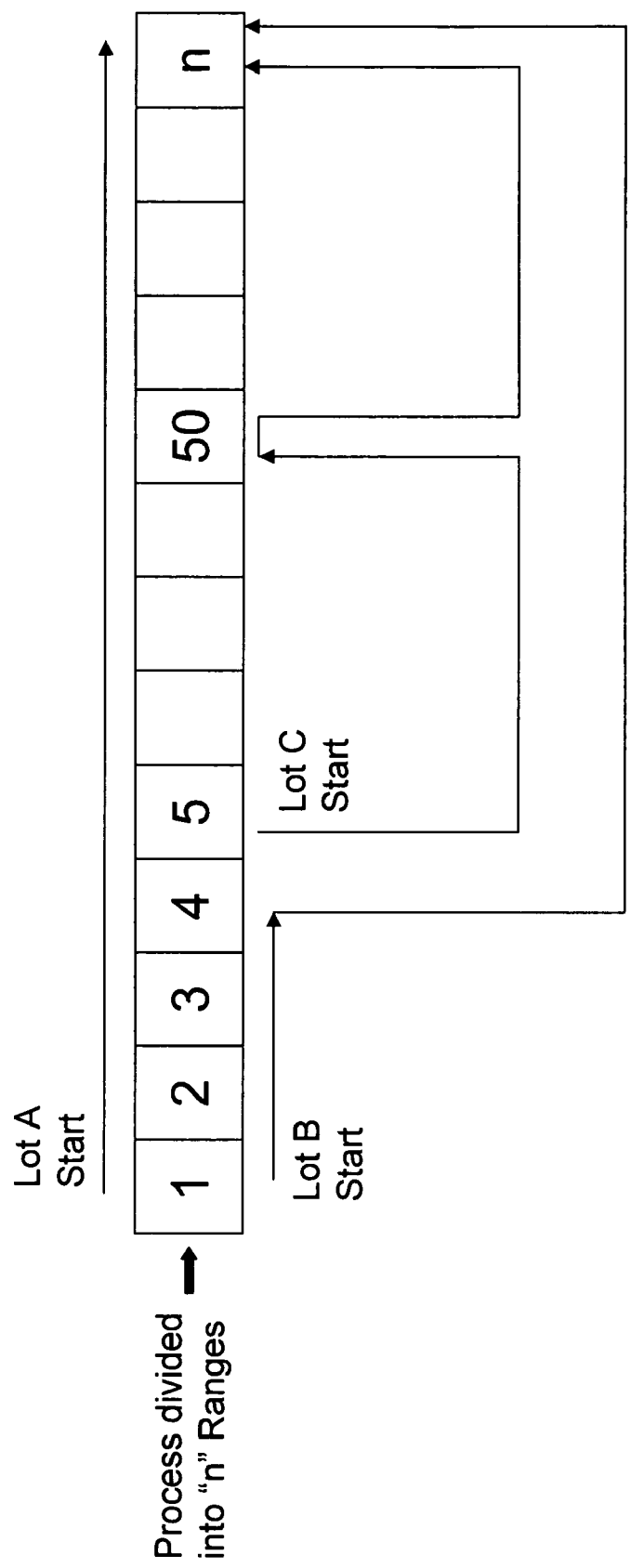
FIG. 2 shows an aspect of the invention.

FIG. 2 shows an exemplary manufacturing process that is divided into ranges "1" through "n". The manufacturing process may be, for example, the manufacture of silicon wafers. Production WIP, depicted as Lot A, undergoes processing in range "1", then in range "2", etc., visiting all of the ranges in order through range "n". Each range corresponds to, for example, one twenty four hour period in which Lot A undergoes certain processes (e.g., operations). The sum of all the ranges is the total process time for Lot A. Thus, the flow of Lot A through the fabricator is predictable, and scheduling and delivery decisions may be made based upon knowledge of the location of Lot A in any particular range.

FIG. 2 also shows the flow of new technology WIP, Lot B and Lot C, which undergoes some of the same operations as the production WIP, Lot A. As seen from FIG. 2, the new technology WIP, in some instances, may not travel the same predictable route as the production WIP. For example, Lot B starts in range "1" and visits ranges "2" through "4", but then jumps to the end of the fabricator, skipping the remaining ranges. Lot C, on the other hand, starts in range 5, then jumps to range 50, then jumps to the end. The flow of the new technology WIP often varies due to research and/or experimentation objectives. Thus, the total cycle time of such new technology WIP is not predictable because it is not known which operations it might experience. Implementations of the invention, however, provide for handling new technology WIP along with production WIP in the same range management system.

Figure 3A:
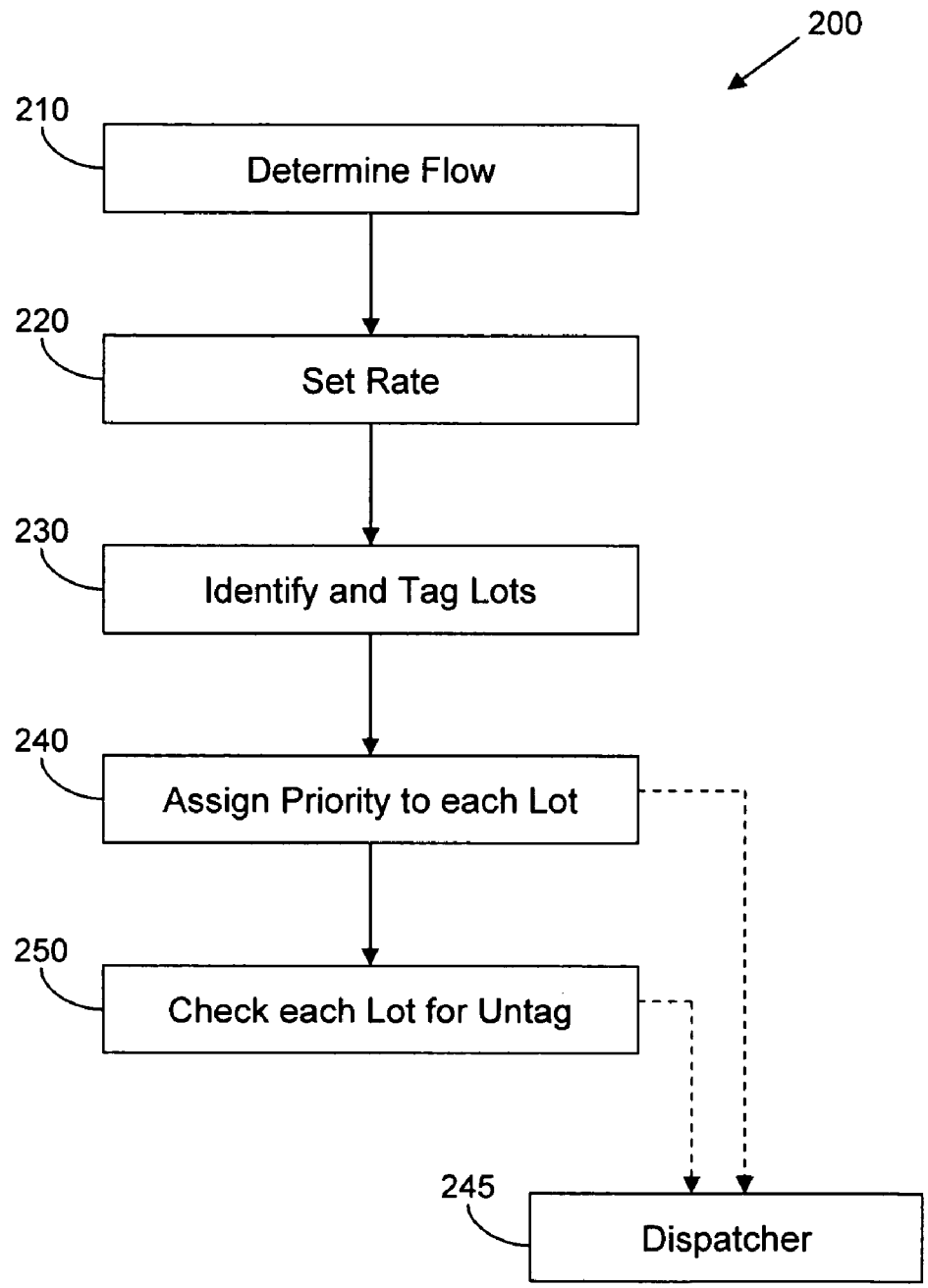
FIGS. 3A-3C show flow diagrams implementing steps in accordance with aspects of the invention.

FIG. 3A is a flow diagram implementing steps of the invention. FIG. 3A may equally represent a high-level block diagram of the invention. The steps of FIG. 3A (and all of the flow diagrams) may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements, or the invention can be executed at least partially manually. The steps of FIG. 3A (and all other flow diagrams) may also be representative of a high-level block diagram implementing the steps thereof.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/N) and DVD. The processes described herein can be implemented in the infrastructure shown in FIG. 1.

Figure 3B:
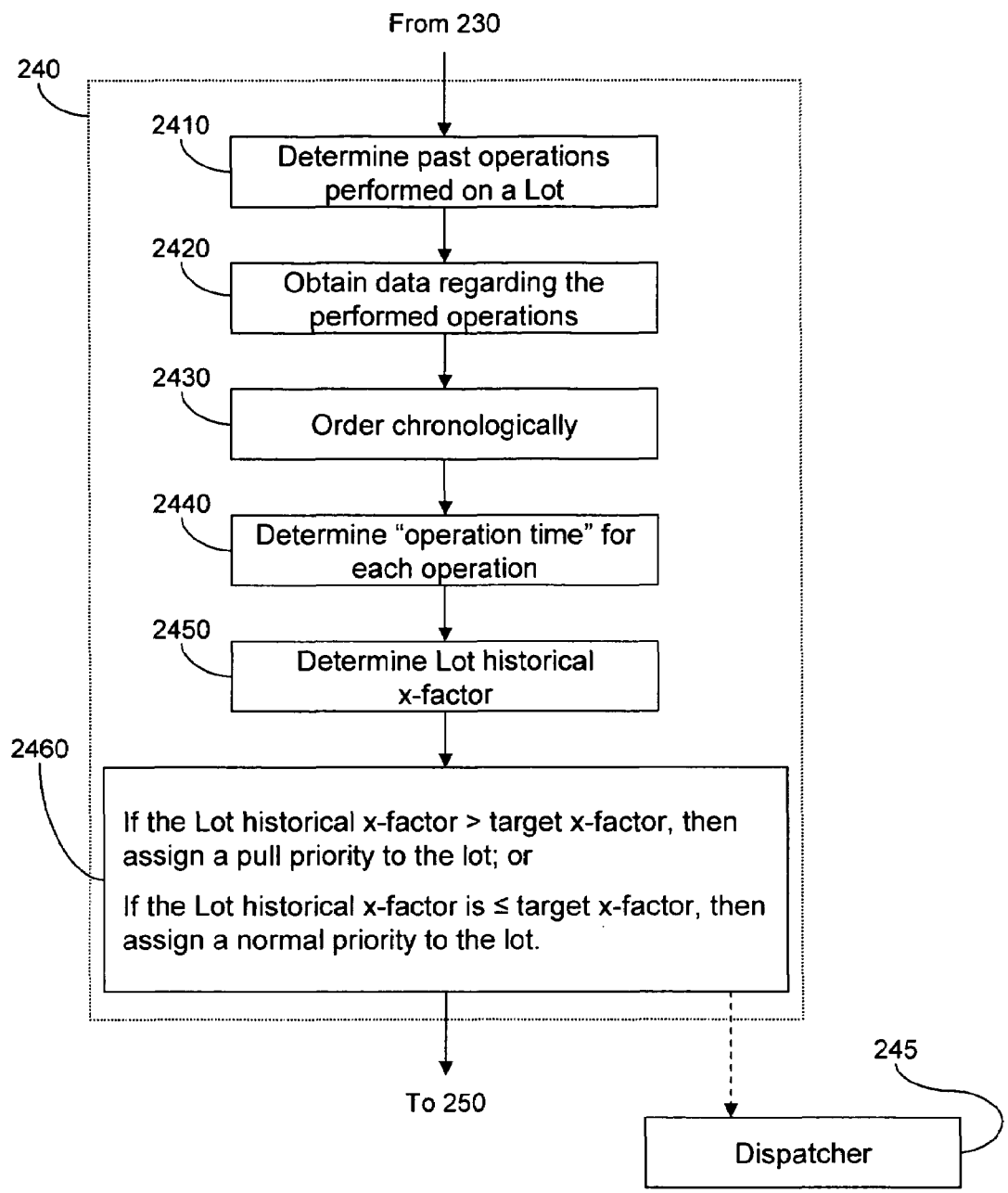
Figure 3C:
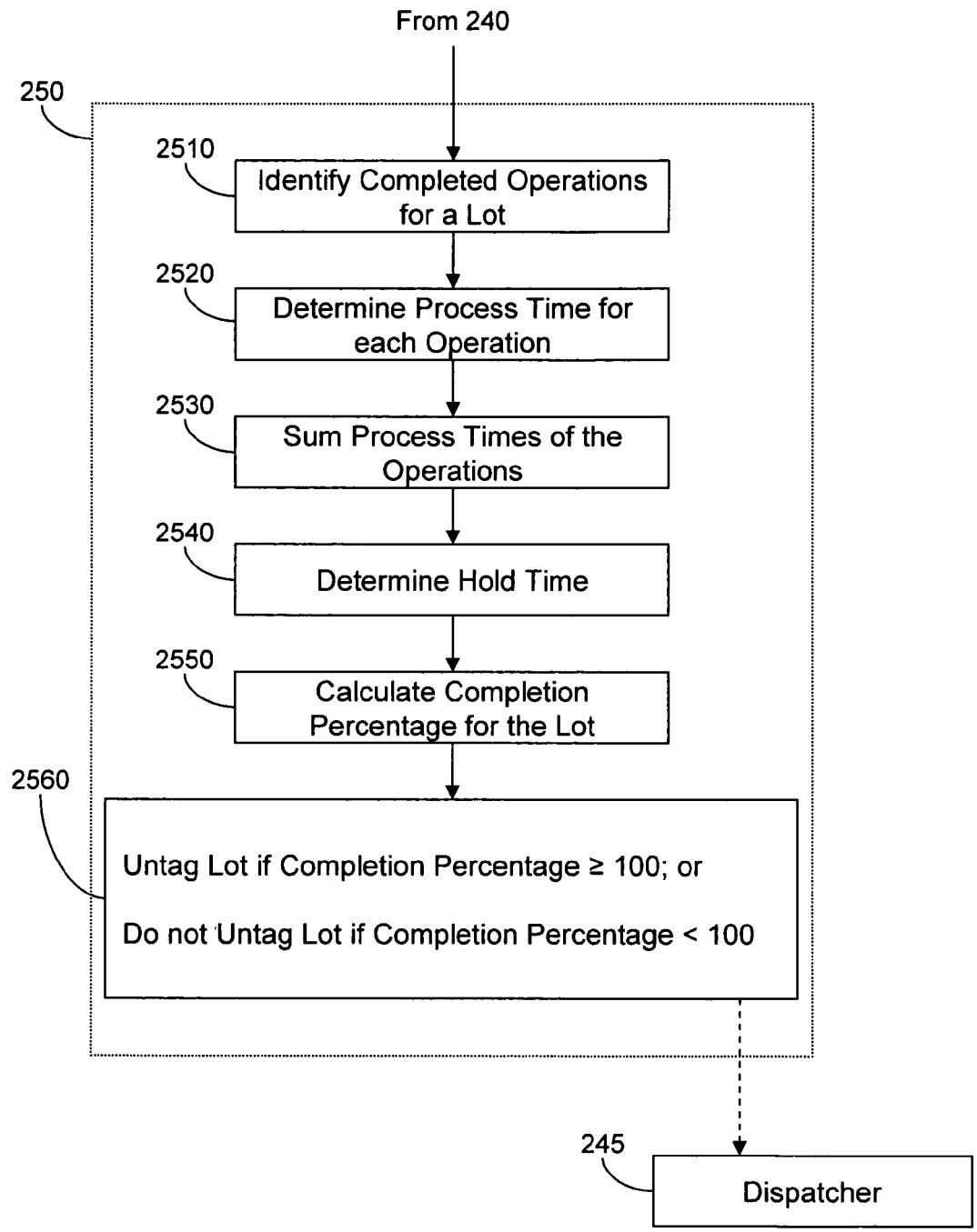

FIGS. 3A-3C show flow diagrams depicting a system 200 and method for controlling the movement of new technology WIP according to embodiments of the invention. At step 210, the new technology WIP flow is determined. In embodiments, the new technology WIP flow will contain all of the routes that have a level of experimental activity that exceeds a threshold level. For example, the level of experimental activity may be quantified by examining a percentage of engineering work request (EWR) operations associated with a route relative to the total number of standard production operations for the route. Engineering work requests represent branch routes used for experimentation and/or research. The percentage of EWR operations may be gathered on each route by month and averaged over several months (or any other time period, depending upon the intended use as contemplated by the invention). Routes having a percentage of EWR operations that exceeds a predetermined threshold are deemed to be in the new technology WIP flow, while routes having a percentage of EWR operations below the threshold are deemed to be in production flow. The threshold may be set at any desired level (e.g., 30%), as dictated by the needs of the fabricator. In an illustrative example, step 210 is performed on a weekly basis, although other time periods are contemplated by the invention.

In embodiments, the data regarding routes and EWRs used at step 210 is attained by accessing existing data of the fabricator. The existing data may be, for example: a conventional floor control system; a database that tracks all of the lots in the fabricator; a range management system (which may be any type of lean manufacturing system) that monitors the lots, operations, ranges, and flows of a fabricator; or a combination of any such systems.

At step 220, the rate for the new technology WIP flow is set. In embodiments, the new technology WIP flow has only one range, and the rate is a takt rate for the range. The rate may be set for any predetermined time period. For instance, the rate may be set daily, resulting in a daily takt rate (DTR), which corresponds to a daily throughput target for the range. In illustrative examples, the rate is set by summing the active WIP target (available from the existing data) for all routes in the new technology WIP flow. In embodiments, active WIP includes any active lot in the new technology WIP flow (even if the lot is on hold), where an active lot is any lot that is currently in any stage of production in the fabricator. In an illustrative embodiment, step 220 is performed on a daily basis, although other time periods are contemplated by the invention.

At step 230, lots that are in the new technology WIP flow are identified and tagged. For example, these lots are identified by determining, from the existing data, which lots are on routes that define new technology WIP flow. The actual amount of active WIP in the new technology flow could be higher than the target WIP, for example because of excessive hold time due to unexpected experimental results or extra engineering analysis. For this reason, in embodiments, a summing routine is used to identify and tag WIP only to the target level. As new technology lots are identified, the WIP in each lot is summed. The summing continues until the first occurrence in which the summed WIP is greater than or equal to the rate from step 220 at which point identification stops. In this manner, a discrete number of lots are identified and tagged as new technology lots. The order of identification of the lots may based on varying criteria. For example, lots may be sorted by a historical x-factor (such as described below) and identified and tagged based on the highest to lowest historical x-factor, or lots may be sorted by time in current operation and identified and tagged based on highest to lowest time in current operation. In embodiments, all of the identified lots, up to the rate setting, are tagged at the beginning of the range day so that the WIP in these tagged lots will be expected to move one day's worth of raw processing time at the assigned new technology flow x-factor (e.g., target x-factor), to be described herein. In an illustrative embodiment, step 230 is performed on a daily basis, although other time periods are contemplated by the invention.

Still referring to FIG. 3A, the new technology lots (e.g., tagged lots) are assigned a priority at step 240. In embodiments, assignment of a priority includes, for each individual tagged lot, comparing the lot historical x-factor to the target x-factor. If the lot historical x-factor is greater than the target x-factor, then the lot is running behind schedule and is assigned a "pull" priority. Otherwise, if the lot historical x-factor is less than or equal to the target x-factor, then the lot is running at or ahead of schedule and is assigned a "normal" priority.

Step 240 further includes utilizing the priority for each tagged lot. In embodiments, utilization may include, for example, communicating the lot priority to a dispatcher 245. The dispatcher 245 may be a supervisor or automated system, such as a floor control system and/or a range management system, which guides the individual operations of the fabrication facility by directing the operations to work on lots in a prescribed order. The dispatcher 245 may, for example, cause a lot with a pull priority to be processed faster than other lots in order to bring the lot back up to speed. In an illustrative embodiment, step 240 is performed on a daily basis, although other time periods are contemplated by the invention.

At step 250, shown in FIG. 3A, tagged lots are checked for untagging. In embodiments, a lot is untagged when it has achieved a predetermined amount of processing within a predetermined time period. For example, each lot may be checked hourly to determine if it has achieved its target process time for the range day. When a lot has achieved its target process time, the lot is untagged such that it undergoes no further processing that day. In this manner, no single lot gets too far ahead of schedule, and all of the lots of the fabricator are driven in an equitable fashion.

In embodiments, the untagging of any lot is communicated to the dispatcher 245, which stops any further processing on the lot for the day. In an illustrative embodiment, step 250 is performed on a hourly basis, but could be performed more or less frequently as dictated by the needs of the fabricator. Furthermore, step 250 need not be performed at equal time intervals, but rather could be performed only a few times a day toward the end of a range day.

FIG. 3B shows non-limiting exemplary details of step 240, in which each tagged lot is assigned with a priority. In embodiments, the lot priority is assigned based on a comparison of the lot historical x-factor to the target x-factor. The target x-factor is a predetermined value that is assigned to a category of lots associated with a given new technology, and is available from the existing data. The target x-factor corresponds to a desired or target ratio of cycle-time performance to processing time. The steps 2410 through 2460 are performed for each tagged lot.

In step 2410, for a particular tagged lot, the operations that have been performed on the lot over a previous predetermined time period are identified. The time period may be, for example, the previous three days, although other time periods are contemplated by the invention. The information regarding all operations that have been performed on a lot is available from the existing data.

In step 2420, data regarding each operation from step 2410 is obtained. The data may include, for example, the operation start time, the operation finish time, and the operation process time. The operation start time is the actual time that the operation began (e.g., work began on the lot). The operation finish time is the actual time that the operation finished (e.g., work ended on the lot). The process time is the minimum time required to process a lot through the particular operation. The process time may include "work" time for which the lot is worked on in the operation, and in embodiments does not include "non-work" time, such as waiting in a queue, transit, etc. It is contemplated, though, that process time may be calculated in other manners, including non-work times, depending on a particular application of the invention. The operation start time, finish time, and process time are available from the existing data.

In step 2430, the operations from step 2410 are ordered chronologically. In embodiments, the operations may be ordered according to their respective finish times. For example, operation "a" may have a finish time of 10:00 am, and operation "b" may have a finish time of 10:30 am.

In step 2440, the operation time for each operation from step 2410 is determined. In embodiments, the operation time is calculated as the difference of finish times of consecutive operations in the chronological order of operations of the lot. From the example above, operation "b" would have a operation time of 30 minutes (10:30−10:00=0:30).

In step 2450, the lot historical x-factor is determined. In embodiments, the lot historical x-factor is the ratio of the sum of the operation times for the operations of the lot to the sum of the process times for the operations of the lot, and corresponds to an actual ratio of cycle-time performance to processing time. This historical x-factor can be expressed as:

Historical x-factor for $Lot_i = \Sigma(\text{operation times})_i / \Sigma(\text{process times})_i$ At step 2460, a priority is assigned to the lot. In embodiments, the priority is assigned based upon a comparison of the lot historical x-factor to the target x-factor. If the lot historical x-factor is greater than the target x-factor, then a "pull" priority is assigned to the lot. If the lot historical x-factor is less than or equal to the target x-factor, then a "normal" priority is assigned to the lot.

In embodiments, step 240 is performed at the beginning of each day, with steps 2410 through 2460 being performed for each tagged lot, although other time periods are contemplated by the invention. In this way, each tagged lot retains its priority (pull or normal) throughout all of the processes that it may undergo in the day.

FIG. 3C shows non-limiting exemplary details of step 250, in which each tagged lot is checked for untagging. In embodiments, a completion percentage is determined for each tagged lot, and the completion percentage is the basis for untagging any particular lot. The steps 2510 through 2560 are performed for each tagged lot.

In step 2510, for a particular tagged lot, the completed operations for that lot for a time period are identified. For example, all of the operations that have been completed on the lot in the current day are identified. This information is available from the existing data.

In step 2520, the process time for each completed operation from step 2510 is obtained from the existing data.

In step 2530, the process times from step 2520 are summed. In embodiments, this sum represents the amount of process time that the lot has undergone in the current day, and is referred to as the completed process time for the lot.

In step 2540, the hold time for each lot is obtained. In embodiments, the hold time represents time that the lot is not in processing and not in a queue. For example, a lot may be on hold for a fabricator engineer to provide a disposition for the lot. The hold time is available from the existing data.

In step 2550, the completion percentage for the lot is calculated. In embodiments, the completion percentage is expressed by:

$CP = (cpt \times txf)/(tp - ht)$ where: CP is the completion percentage;
cpt is the completed process time (e.g., from step 2530);
txf is the target x-factor (e.g., from step 240);
tp is the time period (e.g., from step 2510); and
ht is the hold time (e.g., from step 2540).

In embodiments, the time period (tp) is one day (24 hours), although other time periods are also contemplated by the invention.

In step 2560, the lot is untagged if its completion percentage is greater than or equal to 100%. The lot is not untagged if its completion percentage is less than 100%.

In embodiments, step 250 is performed hourly throughout each day, with steps 2510 through 2560 performed for each tagged lot, although other time periods are contemplated by the invention. In this way, the processing time of each tagged new technology lot is monitored as the lots are processed throughout the day. When any particular lot achieves its target processing time for the day, that lot is untagged and all work on that lot stops for the day.

Implementations of the invention provide a system and method for driving new technology WIP at a controlled speed side-by-side with production WIP using a common range management infrastructure. In embodiments, since it is known that the new technology WIP will not be associated with a known route, there is no attempt to create range breaks boundaries for the new technology WIP. Instead, the new technology WIP is monitored at various intervals over the range day to determine how much process time has been accomplished by each lot. If any particular lot is found to have achieved its process time target for the given range day, that lot is placed in stop mode. In embodiments, a pull factor may be applied to new technology WIP that has fallen behind schedule, thereby prioritizing such new technology WIP higher, causing it to travel faster than other WIP and allowing it to stay on track with the assigned x-factor. In this manner, new technology WIP and production WIP may be driven together in the same fabricator with the same degree of speed and predictability.

Embodiments of the invention may be implemented as an independent entity or as part of a computer integrated production system. Embodiments may be directly integrated into a range management system or a manufacturing execution system (MES), as is commonly used in directing the production of semiconductor fabrication. Although the invention has been described with respect to semiconductor fabrication, it is understood that embodiments could be employed in other manufacturing processes, such as, for example, automobile manufacture.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with modifications and in the spirit and scope of the appended claims.

What is claimed:

1. A system, comprising at least one device configured to:
create a target based on a sum of active work-in-progress (WIP) targets for at least one route;
find all lots of active WIP on the at least one route;
tag each of the lots until a first occurrence of a sum of WIP of the tagged lots exceeds or equals the target; and
assign a priority to each of the tagged lots based on a predetermined criteria,
wherein the target is a daily takt rate for a new technology WIP flow,
the new technology WIP flow contains all routes having a level of experimental activity that exceeds a predetermined threshold, and
tagging is stopped after the first occurrence of the sum of WIP of the tagged lots exceeds or equals the target, such that any remaining lots of active WIP are untagged.

2. The system of claim 1, wherein the active WIP targets and the lots of active WIP are for a first type of product.

3. The system of claim 2, wherein the first type of product is at least one of new technology and experimental technology.

4. The system of claim 1, wherein the target comprises a target throughput for a predetermined time period.

5. The system of claim 1, wherein the predetermined criteria corresponds to a target ratio of cycle-time performance to processing time.

6. The system of claim 5, wherein:
the priority is one of at least a first priority and a second priority;
the first priority is higher than the second priority;
the first priority is assigned to tagged lots whose actual ratio of cycle-time performance to processing time over a predetermined time period is greater than the target ratio of cycle-time performance to processing time; and
the second priority is assigned to tagged lots whose actual ratio of cycle-time performance to processing time over the predetermined time period is less than or equal to the target ratio of cycle-time performance to processing time.

7. The system of claim 6, wherein the predetermined time period is a historical time period of at least a plurality of days.

8. The system of claim 6, wherein the actual ratio of cycle-time performance to processing time over a predetermined time period for any one of the tagged lots is based at least partly upon operation times and processing times for the one of the tagged lots.

9. The system of claim 1, wherein the at least one device is further configured to determine the at least one route based on exceeding a threshold.

10. The system of claim 9, wherein the threshold is based on a level of experimental activity associated with any route.

11. The system of claim 1, wherein the at least one device is further configured to control processing of the tagged lots based at least partly on the priority assigned to each of the tagged lots.

12. The system of claim 11, wherein the at least one device is further configured to untag at least one of the tagged lots based on a comparison of an actual processing time for the at least one of the tagged lots to a target processing time for the at least one of the tagged lots such that the processing of the at least one of the tagged lots is at least temporarily stopped.

13. A method, comprising:
determining a flow of manufacturing processes;
setting a target rate for the flow;
identifying and tagging lots corresponding to the flow;
assigning a priority to each tagged lot;
processing the tagged lots based at least in part on the priority of each lot;
checking each tagged lot for untagging; and
untagging at least one of the tagged lots such that the processing of the at least one of the tagged lots is at least temporarily stopped,
wherein the checking comprises determining a completion percentage (CR) for each tagged lot according to the equation:
$CP = (cpt * txf)/(tp - ht)$. where
CP is the completion percentage,
cpt is a completed process time,
txf is a target x-factor,
tp is a time period, and
ht is a hold time. and
the untagging comprises untagging any tagged lot in which CP is greater than or equal to 100%.

14. The method of claim 13, wherein the determining comprises comparing a level of experimental activity to a threshold amount.

15. The method of claim 13, wherein the setting comprises summing active WIP targets for routes in the flow.

16. The method of claim 13, wherein the identifying and tagging comprises summing WIP of lots in the flow until a first occurrence of a sum of WIP of the tagged lots exceeds or equals the target.

17. The method of claim 13, wherein the assigning comprises comparing, for each tagged lot, an actual ratio of cycle-time performance to processing time over a predetermined time period to a target ratio of cycle-time performance to processing time.

18. The method of claim 13, wherein the untagging comprises comparing an actual processing time for the at least one of the tagged lots to a target processing time for the at least one of the tagged lots.

19. A computer program product comprising a tangible computer readable medium encoded with a computer readable program, wherein the computer readable program when executed on a computer causes the computer to:
create a target based on a sum of active WIP targets for at least one route;
find all lots of active WIP on the at least one route;
tag each of the lots until a first occurrence of a sum of WIP of the tagged lots exceeds or equals the target; and
assign a priority to each of the tagged lots based on a predetermined criteria,
wherein the target is a daily takt rate for a new technology WIP flow,
the new technology WIP flow contains all routes having a level of experimental activity that exceeds a predetermined threshold, and
tagging is stopped after the first occurrence of the sum of WIP of the tagged lots exceeds or equals the target, such that any remaining lots of active WIP are untagged.

* * * * *